Dec. 14, 1926.
E. J. BOROWSKI ET AL
1,610,921
INVALID VEHICLE
Filed Jan. 21, 1925  2 Sheets-Sheet 1
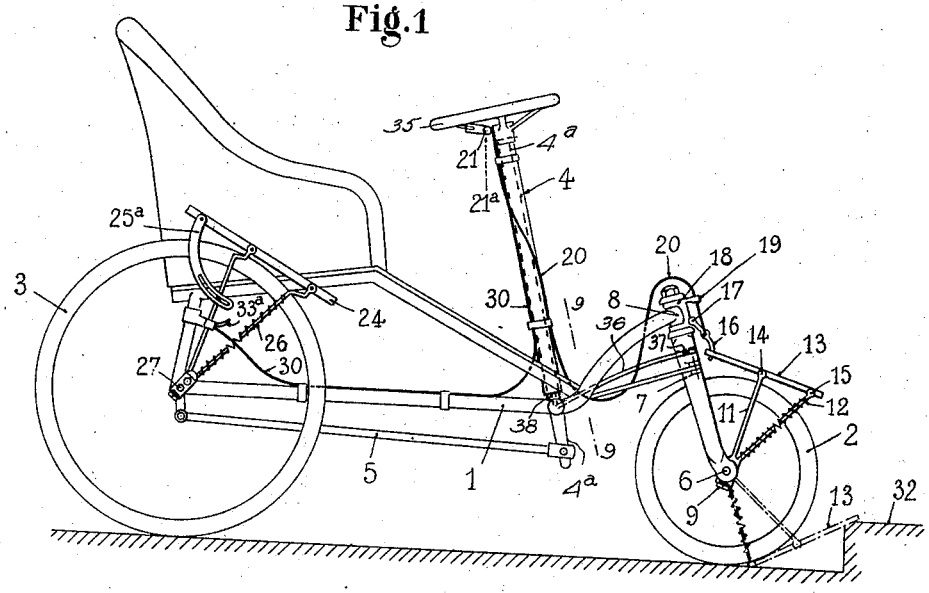
Fig.1
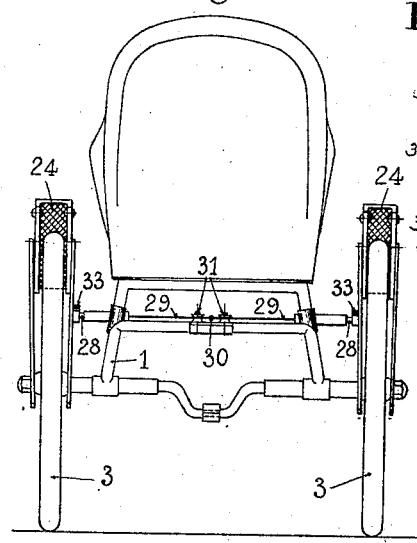
Fig.3
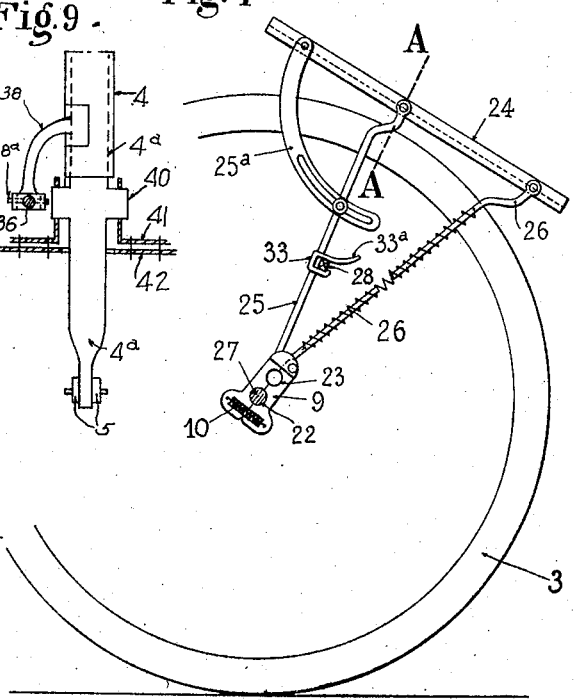
Fig.9
Fig.4
Edmond Jean Borowski
Charles Viaud
INVENTORS
By Otto Munk
Their ATTORNEY.

Dec. 14, 1926.  1,610,921
E. J. BOROWSKI ET AL
INVALID VEHICLE
Filed Jan. 21, 1925   2 Sheets-Sheet 2

Edmond Jean Borowski
Charles Viaud
INVENTORS

By *Otto Munk*
Their ATTORNEY

Patented Dec. 14, 1926.

1,610,921

UNITED STATES PATENT OFFICE.

EDMOND JEAN BOROWSKI, OF LA PLAINE ST.-DENIS, AND CHARLES VIAUD, OF LA COURNEUVE, FRANCE.

INVALID VEHICLE.

Application filed January 21, 1925, Serial No. 3,727, and in France February 7, 1924.

The present invention relates to a device by which invalids when seated in their small vehicles will be enabled to mount upon or descend from the pavements without having recourse to any sloping portions of the same.

The said device, which may be removably fitted upon a vehicle without any modification or deterioration of the latter, is of a simple and light construction, and is chiefly characterized by the fact that it is composed of suitable plates which are movable about the axis of each of the vehicle wheels, said plates being held in the inoperative position by means of hooks or locking bolts which are controlled by small levers placed within reach of the driver; when the said plates are disengaged, they will come in front of the wheels which are to mount upon or descend from the pavement, the said plates returning automatically to the inoperative position when the step has been cleared.

The characteristic features of the said invention are set forth in the following description with reference to the appended drawings in which:

Fig. 1 is an elevation of an invalid vehicle provided with the device according to the invention, the plates being shown in the inoperative position; the dot and dash lines indicate the position of the front plate when the corresponding wheel is to mount upon the pavement.

Fig. 3 shows the rear part of the vehicle.

Fig. 4 is an elevation on a larger scale of the plate of one of the rear wheels in the inoperative position.

in Fig. 8 the jaws are in the open position and the wheel axle is shown when passing from one recess to the other.

Fig. 9 shows a detail of the steering attachment.

Figure 2:
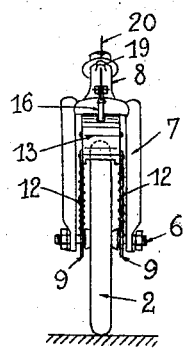
Fig. 2 is a front view of the front wheel.

In the construction shown in the drawing, 1 is the vehicle frame which is mounted in the known manner upon three wheels; the front wheel 2 is the steering wheel and the two rear wheels 3 are the driving wheels and are actuated by means of the link 5 and of the pivoted lever 4ª which is adapted to oscillate by means of trunnions 40 on the bearings of a support 41 secured to the footboard of the vehicle, as shown in detail in Fig. 9. The outer tube 4 to which the hand wheel 35 is secured serves for the steering of the front wheel, as it will be hereinafter described.

The front wheel 2 rotates upon its axle 6 held in the fork 7 which is movable in the sleeve 8 mounted upon the vehicle frame. Each end of the axle 6 is held in a clamping device 9 whereof the two jaws are urged together by the spring 10, and which is connected by a rigid rod 11 and by an elastic rod 12 with the plate 13; the rods 11 and 12 are respectively pivoted at 14 and 15 to the said plate which is preferably made of steel and is ribbed for the sake of stiffness. The surface of said plate adjacent the wheel is suitably striated in order that the periphery of said wheel may properly adhere to said plate when necessary.

The plate 13 is held in the inoperative position by the hook 16 whereof one end engages in a hole in the said plate; said hook which is pivoted on the axle pin 17 is mounted upon a collar 18 which surrounds the sleeve 8 and is provided at 19 with a ring for guiding the cable 20 which serves to control the said hook. The said cable, which is preferably of the Bowden type is attached at one end to an operating lever or handle within the driver's reach, it being consequently disposed upon the steering wheel 35.

Figure 8:
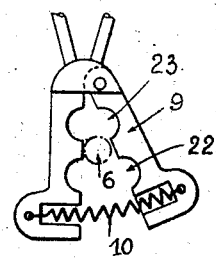

Each jaw of the clamping device 9 has two corresponding recesses 22 and 23, and when the device is closed by the spring 10 the said recesses form two cylindrical bearing parts which have substantially the same diameter as the wheel axle 6. In the inoperative position the axle 6 is revoluble in the bearing 22, but when the wheel rolls upon the plate 13, and during the displacement of the plate which returns to the inoperative position, the said axle will be revoluble in the bearing 23; said axle is enabled to proceed from one bearing to the other by opening the jaws of the clamping device, as shown in Fig. 8.

Upon each of the rear wheels 3 is mounted a plate 24 analogous to the plate 13 and connected by the rigid rods 25 and the elastic rods 26—analogous to the rods 11 and 12—with a like clamping device 9 mounted on the wheel axle 27 and at either side of the wheels. In the inoperative position, the axle 27 is revoluble in the bearing part 22, but when the wheels roll upon the said plates, the axle will be revoluble in the bearing part 23. Due to the increased length of the plate 24 the device may comprise a slotted strut 25ª.

Each of the said plates 24 is held in the inoperative position by a sliding bolt 28 engaging in a catch or staple consisting of a metallic piece 33 of suitable shape which is secured to the rigid rod 25 of each plate 24; said metallic piece has an extension 33ª for guiding the said bolt in such manner that it will enter the said staple when the said plate returns to the inoperative position after use.

The two bolts 28 are spring pressed outwardly so as to hold the respective plates 24; they are connected together by a cable 29 so that they may be operated at the same time by a single cable 30 which is attached to the cable 29 between the guiding rollers 31. The end of the cable 30 is attached to a handle 21ª which is mounted on the pivoted lever 4.

The operation is as follows:

In order to mount upon the pavement 32, the vehicle is brought before the curbing in the perpendicular position, and when the front wheel 2 is near the edge the driver presses upon the outer end of the control lever 21 so as to draw upon the cable 20 within its outer tubing in the manner proper to a Bowden brake control attachment in order so as to rotate the hook 16 about the axle pin 17 and thus disengage the plate 13; said plate will rotate on the wheel axle 6 and will assume the position shown in the dot and dash lines in Fig. 1. The vehicle is then moved forward; the wheel is engaged upon the plate 13, and since the distance between said plate and the bearing 22 in which the axle 6 is now situated is greater than the diameter of the wheel 2, the rigid rods 11 will push upon the jaws of the clamp 9; the axle 6 will open the clamp (Fig. 8) and it will then enter the bearing part 23 whose distance from the said plate is equal to the diameter of the wheel. The said wheel will now mount upon the pavement.

Due to the elastic rod 12, the plate 13 is enabled to properly enter into contact with the ground and with the edge of the pavement.

When the front wheel has thus mounted upon the pavement, the said wheel will continue its rotation and will thus actuate by friction contact the plate 13 which is applied against it by the spring of the elastic rod 12 and which by reason of its striated surface will be prevented from slipping upon the surface of the wheel. The entraining effect of the rotation will also be facilitated by the clamping action of the jaws of the clamp 9 upon the axle 6 when urged by the springs 10.

When the plate 13 moves together with the wheel it will pass between the branches of the fork 7; but since the hook 16 has now resumed the normal position under the effect of a suitably disposed reaction spring, it will engage in the hole in the said plate when the latter comes in register therewith, so that the plate 13 will thus be held in position, and since the forward motion of the wheel will tend to drive forward the said plate, the jaws 9 will be open for this reason and the axle 6 will now enter the bearing part 22. The device is now in the normal or inoperative position.

Figure 5:
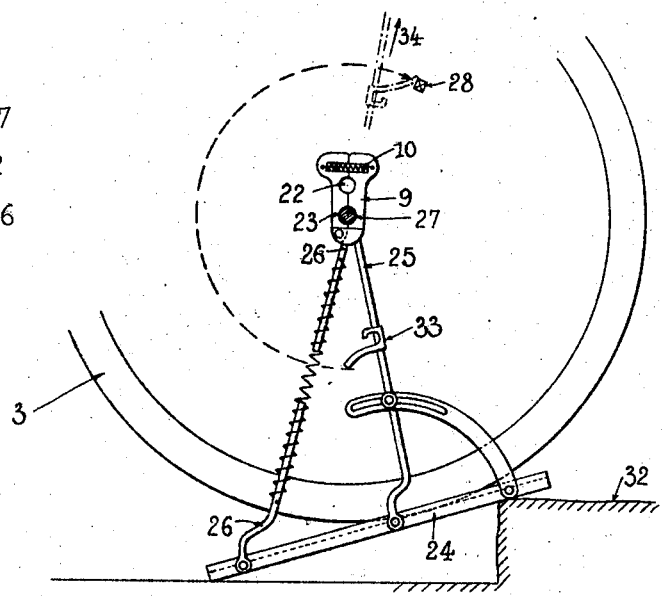
Fig. 5 shows the same plate when the vehicle wheel rolls thereupon in order to mount upon the pavement; the dot and dash lines show the path followed by the staple of the bolt when the said plate returns to the inoperative position.
Figure 6:
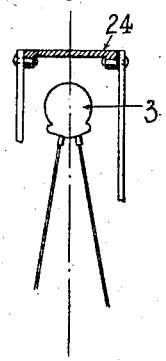
Fig. 6 is a partial cross section on the line A—A of Fig. 4.
Figure 7:
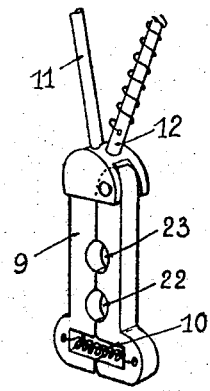
Figs. 7 and 8 are detail views on a larger scale of the jaws mounted on the wheel axles and connected with the corresponding plates.

When the rear wheels 3 approach the edge of the pavement 32, the driver acts upon his control lever or handle 21ª, thus drawing upon the cable 30 in the same manner as described above for the operation of the cable 20; the bolts 28 will be disengaged from the staples 33 by means of the cable 29. The two plates 24 which are now released will pivot about the axle 27 and will come into position in front of the wheels. As the vehicle moves forward, the said wheels will mount upon the plates 24; since the rods 25 are rigid, they will oblige the jaws of the clamps 9 to open, and the axle 27 will thus enter the recess 23. The wheels will roll upon the plates, Fig. 5, which latter are well maintained in contact with the ground and with the edge of the pavement by the elastic rods 26.

When the wheels 3 are in the proper position on the pavement, the plates 24 which are in close contact with said wheels will rotate with the latter, and this motion will be facilitated by the friction of the clamps 9 upon the axle 27. In the movement of rotation of said plate, the extension 33ª of the member 33 mounted on one of the rigid rods 25 of each plate will come into contact with the respective bolt 28 which has now resumed its normal position since the control handle 21ª is no longer acted upon; said bolt will engage in the staple 33, but at the same time, due to the shape of the extension 33ª, it will cause the said plate to move in the direction of the arrow 34 and thus become separated from the wheel; the jaws of the clamps 9 will then move apart, and the axle 27 will resume its position in the recesses 22 and the clamps 9 become closed. The device is thus in the normal or inoperative position.

If on the contrary the vehicle is to descend from the pavement, it is brought into the position in which it is perpendicular to the edge. The front wheel is stopped as near as possible to this edge; the plate 13 is released from the hook 16 and comes upon the pavement in front of the said wheel; the vehicle is then moved forward, and the front wheel travels upon the said plate, so that the latter will tip over and will bear upon the edge of the pavement and upon the ground, this movement being made possible by the elastic rods 12.

The operation of the rear wheels is performed in the same manner as above stated. The steering of the vehicle may be obtained in any preferred manner, for instance by means of a lever 36 one end of which is fulcrumed to the outer end of an arm 37 secured to the fork 7, the other end of which being fulcrumed at 38ª to a bent lever 38 secured to the outer tube 4 to which the hand wheel 35 is rigidly connected.

Obviously, the device hereinbefore described is susceptible of various modifications without departing from the spirit of the invention, and in particular, the elastic rods 12 and 26 may be constructed in any suitable manner, and each rod may for instance consist of two telescoping tubes containing a spring.

Having now described our invention what we claim as new and desire to secure by Letters Patent is:

1. In an invalid vehicle the combination of plates respectively disposed in front of the vehicle wheels, means for pivotally mounting said plates upon the wheel axles and whereby said plates are successively brought into contact with the periphery of the wheels and removed therefrom, and means operated by the driver for locking said plates in the latter or inoperative position.

2. In an invalid vehicle the combination of plates respectively disposed in front of the vehicle wheels, means for pivotally mounting said plates upon the wheel axles at a distance from the periphery of the wheels normally greater than the radius thereof and whereby said wheels, under the weight of the vehicle, are caused to engage said plates when the latter are in contact with the ground, and means for locking said plates in their position removed from the wheels.

3. In an invalid vehicle the combination of plates respectively disposed in front of the vehicle wheels, means for pivotally mounting said plates upon the wheel axles at a distance from the periphery of the wheels normally greater than the radius thereof and whereby said wheels, under the weight of the vehicle, are caused to engage said plates when the latter are in contact with the ground, and means for subsequently and automatically returning said plates to their position removed from the wheels and for locking the same in the latter position.

4. The combination with each wheel of an invalid vehicle, of a plate, two jaws pivoted to and yieldingly urged towards each other, two bores respectively formed by half in said jaws and whereby the latter are adapted to rotate on the wheel axle, a rigid rod and a yielding rod pivoted at one end to one of said jaws and at the other end to said plate, the distances between said bores and said plate being respectively equal to and greater than the wheel radius, means carried by the vehicle frame and adapted to exert a traction upon said rigid rod and jaws and to lock said plate above the wheel when the plate is brought by contact with the wheel above the latter and means operated by the driver for releasing said plate from said locking means.

5. The combination with each wheel of an invalid vehicle, of a plate, two jaws pivoted to and yieldingly urged towards each other, two bores respectively formed by half in said jaws and whereby the latter are adapted to rotate on the wheel axle, a rigid rod and a yielding rod pivoted at one end to one of said jaws and at the other end to said plate, the distances between said bores and said plate being respectively equal to and greater than the wheel radius, a hole in said plate and a hook carried by the vehicle frame and operated by the driver and adapted to engage said hole and stop said plate when the latter is brought by contact with the wheel above the same.

6. The combination with each wheel of an invalid vehicle, of a plate, two jaws pivoted to and yieldingly urged towards each other, two bores respectively formed by half in said jaws and whereby the latter are adapted to rotate on the wheel axle, a rigid rod and a yielding rod pivoted at one end to one of said jaws and at the other end to said plate, the distances between said bores and said plate being respectively equal to and greater than the wheel radius, a cam shaped catch carried by said rigid rod and a bolt carried by the vehicle frame and operated by the driver and adapted to engage said catch and to exert a traction upon said rigid rod and jaws when said plate is brought by contact with the wheel above the latter.

In testimony whereof we have signed our names to this specification.

EDMOND JEAN BOROWSKI.
CHARLES VIAUD.